United States Patent
Anderson-Hanley

(10) Patent No.: US 11,004,351 B2
(45) Date of Patent: May 11, 2021

(54) INTERACTIVE PHYSICAL AND COGNITIVE EXERCISE SYSTEM AND METHOD

(71) Applicant: Cay Anderson-Hanley, Clifton Park, NY (US)

(72) Inventor: Cay Anderson-Hanley, Clifton Park, NY (US)

(73) Assignee: Union College, Schenectady, NY (US)

( * ) Notice: Subject to any disclaimer, the term of this patent is extended or adjusted under 35 U.S.C. 154(b) by 157 days.

(21) Appl. No.: 15/087,351

(22) Filed: Mar. 31, 2016

(65) Prior Publication Data

US 2016/0293033 A1    Oct. 6, 2016

Related U.S. Application Data

(60) Provisional application No. 62/140,991, filed on Mar. 31, 2015.

(51) Int. Cl.
*G09B 7/02* (2006.01)
*G09B 5/02* (2006.01)

(52) U.S. Cl.
CPC    *G09B 7/02* (2013.01); *G09B 5/02* (2013.01)

(58) Field of Classification Search
CPC ............ A63B 24/0003; A63B 2220/62; A63B 2220/20; G09B 7/02; G09B 5/02
See application file for complete search history.

(56) References Cited

U.S. PATENT DOCUMENTS

| | | | |
|---|---|---|---|
| 4,408,613 A | 10/1983 | Relyea | |
| 4,542,897 A | 9/1985 | Melton et al. | |
| 5,524,637 A * | 6/1996 | Erickson | A61B 5/222 600/592 |
| 5,890,995 A * | 4/1999 | Bobick | A63B 24/0084 482/4 |
| 5,961,332 A * | 10/1999 | Joao | G16H 10/20 434/236 |
| 7,497,807 B2 | 3/2009 | Neff et al. | |
| 7,678,023 B1 * | 3/2010 | Shea | A63B 24/0087 482/9 |
| 7,695,406 B2 * | 4/2010 | Waters | A63F 13/10 482/8 |

(Continued)

FOREIGN PATENT DOCUMENTS

WO    WO2009049404 A1    4/2009

OTHER PUBLICATIONS

Anderson-Hanley, C., Arciero, P.J., Brickman, A.M., Nimon, J.P., Okuma, N., Westen, S.C., Merz, M.E., Pence, B.D., Woods, J.A., Kramer, A.F., and Zimmerman, E.A., Exergaming and Older Adult Cognition—A Cluster Randomized Clinical Trial, American Journal of Preventative Medicine, 2012, 42(2), pp. 109-119, Elsevier Inc.

(Continued)

*Primary Examiner* — Malina D. Blaise
(74) *Attorney, Agent, or Firm* — Bond, Schoeneck & King, PLLC; Joseph Noto

(57) ABSTRACT

A system and method for enhancing cognitive function of an individual during exercising use stationary exercise equipment to self-propel the individual's avatar or avatar's point of view through a virtual pathway while interacting to complete a cognitive task including registration of the task, verification of discrimination of basic learning, and performance of manipulation of the cognitive task.

20 Claims, 7 Drawing Sheets

(56) References Cited

U.S. PATENT DOCUMENTS

| | | | |
|---|---|---|---|
| 7,736,272 B2 | 6/2010 | Martens | |
| 7,824,310 B1* | 11/2010 | Shea | A63B 24/0087 |
| | | | 482/9 |
| 7,874,957 B2 | 1/2011 | Hurwitz et al. | |
| 8,905,844 B2* | 12/2014 | Okamoto | A63F 13/06 |
| | | | 463/36 |
| 9,302,179 B1* | 4/2016 | Merzenich | A63F 13/80 |
| 9,474,970 B2* | 10/2016 | Kil | A63F 13/428 |
| 2002/0103428 A1* | 8/2002 | deCharms | A61B 5/055 |
| | | | 600/410 |
| 2003/0077556 A1* | 4/2003 | French | A61B 5/1113 |
| | | | 434/258 |
| 2006/0183980 A1* | 8/2006 | Yang | G16H 20/70 |
| | | | 600/301 |
| 2008/0108035 A1* | 5/2008 | Warda | G09B 7/02 |
| | | | 434/335 |
| 2009/0098980 A1* | 4/2009 | Waters | G16H 20/30 |
| | | | 482/8 |
| 2009/0233769 A1* | 9/2009 | Pryor | B60R 11/0235 |
| | | | 482/8 |
| 2009/0298650 A1* | 12/2009 | Kutliroff | A63B 24/0006 |
| | | | 482/8 |
| 2010/0041000 A1* | 2/2010 | Glass | G09B 5/02 |
| | | | 434/179 |
| 2013/0040714 A1* | 2/2013 | Rosing | A63F 13/69 |
| | | | 463/7 |
| 2013/0216988 A1* | 8/2013 | You | G09B 25/08 |
| | | | 434/236 |
| 2014/0032234 A1* | 1/2014 | Anderson | A61B 5/112 |
| | | | 705/2 |
| 2014/0100464 A1* | 4/2014 | Kaleal | A61B 5/0205 |
| | | | 600/508 |
| 2014/0134584 A1* | 5/2014 | French | G09B 19/0038 |
| | | | 434/247 |
| 2014/0188009 A1* | 7/2014 | Lange | A61B 5/1127 |
| | | | 600/595 |
| 2014/0256511 A1* | 9/2014 | Smith | G10H 7/00 |
| | | | 482/8 |
| 2014/0274564 A1* | 9/2014 | Greenbaum | A63F 13/28 |
| | | | 482/5 |
| 2014/0315169 A1* | 10/2014 | Bohbot | G09B 19/00 |
| | | | 434/236 |
| 2015/0301643 A1* | 10/2015 | Hafidh | G06F 3/03547 |
| | | | 345/174 |
| 2016/0005320 A1* | 1/2016 | deCharms | A61B 8/0808 |
| | | | 434/236 |
| 2016/0078780 A1* | 3/2016 | Alexander | G09B 7/00 |
| | | | 600/508 |
| 2017/0021279 A1* | 1/2017 | Kim | A63F 13/00 |
| 2017/0080320 A1* | 3/2017 | Smith | G10H 1/42 |

OTHER PUBLICATIONS

Donner, A. Goldstein, D., and Loughran, J., Health e-Games Market Report: Status and Opportunities, 2008 Physic Ventures, LLC.

Anguera, J.A., Boccanfuso, J., Rintoul, J.L., Al-Hashimi, O., Faraji, F., Janowich, J., Kong, E., Larraburo, Y., Rolle, C., Johnston, E., and Gazzaley, A., Video Game Training Enhances Cognitive Control in Older Adults, Nature, Sep. 5, 2013, vol. 501, pp. 97-103, Macmillan Publishers Limited, doi:10.1038/niature12486.

Stern, Y., Blumen, H.E., Rich, L.W., Richards, A., Herzberg, G., and Gopher, D. (2011): Space Fortress Game Training and Executive Control in Older Adults: A Pilot Intervention, Aging, Neuropsychology, and Cognition, DOI: 10.1080/13825585.613450.

Anderson-Hanley, C., Tureck, K., and Schneiderman, R.L., Autism and Exergaming: Effects on Repetitive Behaviors and Cognition, Psychology Research and Behavior Management, 2011:4, pp. 129-137, Dover Medical Press Ltd., DOI: 10.2147/PRBM.S24016.

Cohen, J., Rudolph, E., and Anderson-Hanley, C., Abstract Proof: Aerobic and Cognitive Exercise Over Time: Virtual versus Outdoor Cycling, Sep. 23, 2014, ScholarOne Abstracts, Control ID: 1845077.

Shah, N., Dimitrova, J., Mulkerrin, E., Hogan, M., Arciero, P., and Anderson-Hanley, C., Abstract Proof: Aerobic and Cognitive Exercise Study (ACES): Pilot Study in Ireland, Current Track: Behavioral Medicine in Clinical and Medical Settings, Sep. 23, 2014, ScholarOne Abstracts, Control ID: 1844973.

Anderson-Hanley, C., Rudolph, E., Moore, C., and Snyder, A., Abstract Proof: Aerobic and Cognitive Exercise: Virtual versus Outdoor Cycling, Current Track: Environmental and Contextual Factors in Health and Behavior Change, Sep. 23, 2014, ScholarOne Abstracts, Control ID: 1844009.

\* cited by examiner

INTERACTIVE PHYSICAL AND COGNITIVE EXERCISE SYSTEM AND METHOD

CROSS REFERENCE

This application claims the benefit of the filing date of U.S. Provisional Patent Application Ser. No. 62/140,991, filed Mar. 31, 2015, which is hereby incorporated by reference in its entirety.

FIELD OF INVENTION

The present disclosure relates to a system and method for enhancing cognitive function of an individual by combining interactive mental and physical exercise.

BACKGROUND

U.S. Pat. No. 4,542,897 to Melton describes an exercise cycle with an interactive amusement device whereby the apparatus provides amusement and an incentive to perform monotonous exercise routines as well as developing mental and manual coordination skills simultaneously with physical development rather than improve or prevent decline in cognitive function.

WO 2009/049404 to Bergeron describes a system where cognitive training can optionally be used in conjunction with physical activity. The basic principle is to use algorithms on a computerized system to adjust task parameters from trial to trial to personalize the difficulty of each cognitive task during training.

Other prior art discloses the interactivity of a computer system/virtual display/gaming with physical motion, but does not incorporate, declare or strategize cognitive training for the purposes of enhancing cognitive function or preventing cognitive decline, instead, these inventions are provided for tracking exercise behavior, improving motivation, providing amusement, and so forth. Others provide mental stimulation while exercising, but there is no systematic program to improve cognitive function, just amusement.

SUMMARY

In accordance with an aspect of the present disclosure there is provided a method for enhancing cognitive function of an individual including using stationary exercise equipment to self-propel the individual's avatar or avatar's point of view through a virtual pathway for a predetermined length of time in accordance with the performance of an interactive cognitive task including registration of the task, verification of basic learning of the task via discrimination, and performance of a cognitive manipulation.

In accordance with an aspect of the present disclosure there is provided a non-transitory computer readable medium having stored thereon instructions for enhancing cognitive function of an individual comprising machine executable code which when executed by at least one processor, causes the processor to perform steps including: providing to the individual instructions comprising a first cognitive task including resented stimuli; executing a first set of presented stimuli of the first cognitive task by self-propelling on the stationary exercise equipment and navigating the individual's avatar or avatar's point of view through the virtual pathway setting whereby the propulsion and navigation are controlled by the individual to register the first set of presented stimuli a first time in accordance with the instructions; repeating the execution of the first set of presented stimuli until successfully registering the first set of presented stimuli of the first cognitive task a predetermined number of times in accordance with the instructions; executing a second set of presented stimuli of the first cognitive task by self-propelling on the stationary exercise equipment and navigating the individual's avatar or avatar's point of view through the virtual pathway setting whereby the propulsion and navigation are controlled by the individual to verify discrimination of the second set of presented stimuli a first time in accordance with the instructions; repeating the execution of the second set of presented stimuli until successfully verifying discrimination of the second set of presented stimuli of the first cognitive task a predetermined number of times in accordance with the instructions; executing a third set of presented stimuli of the first cognitive task by self-propelling on the stationary exercise equipment and navigating the individual's avatar or avatar's point of view through the virtual pathway setting whereby the propulsion and navigation are controlled by the individual to perform manipulation of the cognitive task of the third set of presented stimuli a first time in accordance with the instructions; and repeating the execution of the third set of presented stimuli until successfully performing manipulation of the third set of presented stimuli of the first cognitive task a predetermined number of times in accordance with the instructions.

In accordance with an aspect of the present disclosure there is provided a method for enhancing cognitive function of an individual including: using stationary exercise equipment to self-propel the individual's avatar or avatar's point of view through a virtual pathway for a predetermined length of time; providing to the individual instructions including a first cognitive task including presented stimuli; executing a first set of presented stimuli of the first cognitive task by self-propelling on the stationary exercise equipment and navigating the individual's avatar or avatar's point of view through the virtual pathway setting whereby the propulsion and navigation are controlled by the individual to register the first set of presented stimuli a first time in accordance with the instructions; repeating the execution of the first set of presented stimuli until successfully registering the first set of presented stimuli of the first cognitive task a predetermined number of times in accordance with the instructions; executing a second set of presented stimuli of the first cognitive task by self-propelling on the stationary exercise equipment and navigating the individual's avatar or avatar's point of view through the virtual pathway setting whereby the propulsion and navigation are controlled by the individual to verify discrimination of the second set of presented stimuli a first time in accordance with the instructions; repeating the execution of the second set of presented stimuli until successfully verifying discrimination of the second set of presented stimuli of the first cognitive task a predetermined number of times in accordance with the instructions; executing a third set of presented stimuli of the first cognitive task by self-propelling on the stationary exercise equipment and navigating the individual's avatar or avatar's point of view through the virtual pathway setting whereby the propulsion and navigation are controlled by the individual to perform manipulation of the third set of presented stimuli a first time in accordance with the instructions; and repeating the execution of the third set of presented stimuli until successfully performing the manipulation of the third set of presented stimuli of the first cognitive task a predetermined number of times in accordance with the instructions.

DETAILED DESCRIPTION

The disclosed interactive physical and cognitive exercise system (iPACES™) is composed of interactive software and hardware provided by a computer-based video program integrated with exercise equipment which facilitates enhanced cognitive function, by enabling an exerciser to learn, practice, and improve performance on a working memory task that is naturalistically embedded in a virtual pathway in the video program whereby propulsion and navigation along the virtual path are controlled by the exerciser. The specific form of exercise equipment could include any suitable type, such as stationary equipment for self-propelling forms of exercise such as cycling, walking, skiing, climbing, paddling, jogging, running, rowing, and the like, by way of example. The specific cognitive task could include any suitable task, to train a cognitive function, such as working memory or other executive function skills, verbal or visual memory, visuo-spatial skill, attention, psycho-motor skill, reaction time, and the like, by way of example.

Figure 1:
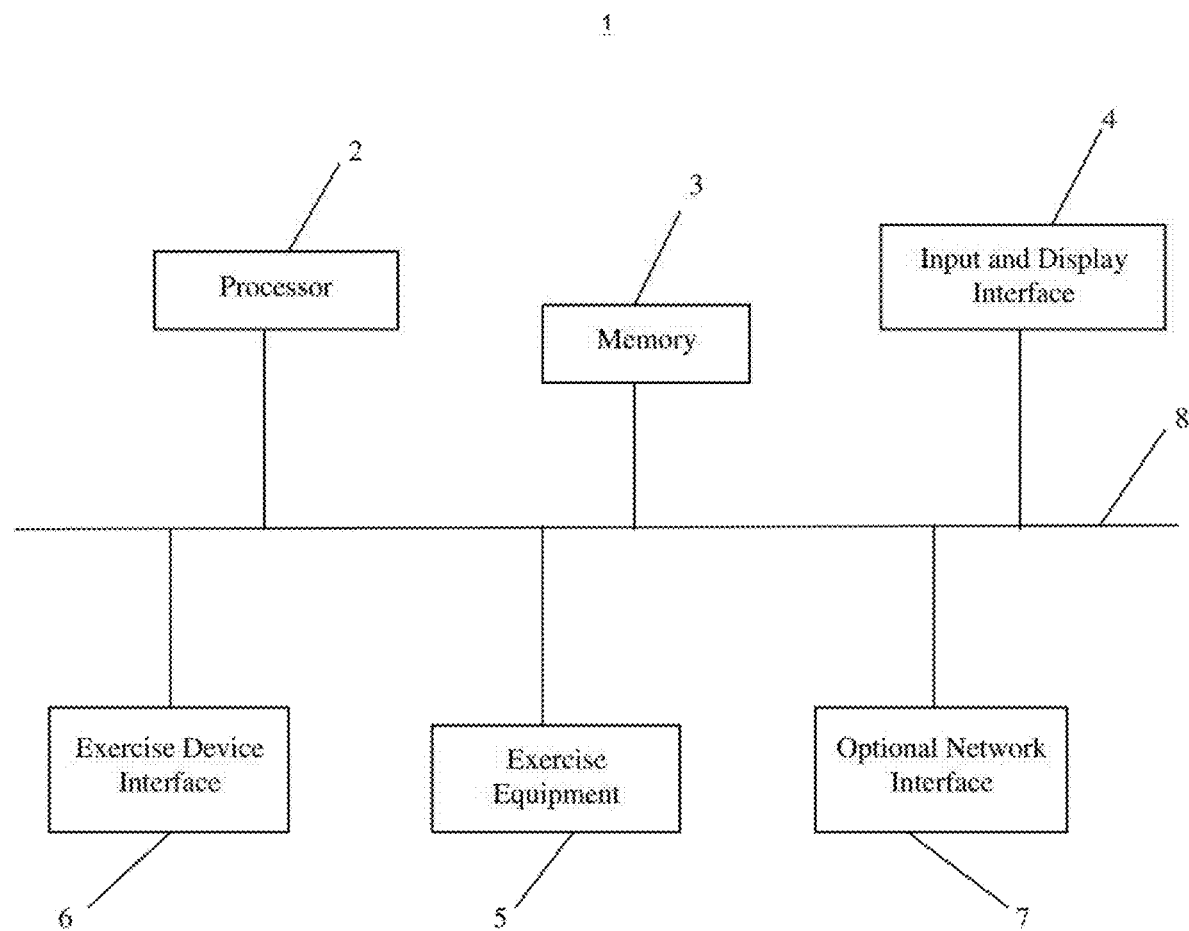
FIG. 1 is an exemplary block diagram of an image management computing device in accordance with the present disclosure.

Referring more specifically to FIG. 1, in an embodiment the iPACES™ 1 includes a central processing unit (CPU) or processor 2, a memory 3, input and display device interface 4, exercise equipment 5, exercise device interface 6, and an optional network interface device 7 which are coupled together by a bus or other link 8, although other numbers and types components and elements can be present within the system. The exercise equipment 5 can be any exercise apparatus having an exercise device interface 6 with the computer in accordance with the program, including by way of example, but not limited to stationary bicycles, stair climbers, rowing machines, treadmills, skiing machines, and elliptical machines.

The processor 2 in the system executes a program of stored instructions for one or more aspects of the present technology as described and illustrated by way of the examples herein, although other types and numbers of processing devices and logic could be used and the processor could execute other numbers and types of programmed instructions.

The memory 3 in the system stores these programmed instructions for one or more aspects of the present technology as described and illustrated herein, although some or all of the programmed instructions could be stored and executed elsewhere. A variety of different types of memory storage devices, such as a random access memory (RAM) or a read only memory (ROM) system or a floppy disk, hard disk, CD ROM, DVD ROM, or a non-volatile memory such as a secure digital card or other non-transitory computer readable medium which is read from and written to by a magnetic, optical, or other reading and writing system that is coupled to the processor, can be used for the memory in the present system.

An input and display device interface 4 enables a user, to interact with the exercise equipment and integrated video program, such as to select items or operate the program, by way of example only. Input devices may include a touch screen, liquid crystal display screen, keyboard and/or a computer mouse and display devices may include a computer monitor, or a liquid crystal display, although other types and numbers of input devices and display devices could be used. The input and display device interface enables the computer to be able to "register" performance of the user on the equipment. The exercise device interface 6, for example, is fashioned to detect steering to the proper location on the path in the video program to "tag" a given sign by the users operation of the exercise equipment. For example, an input/response device on a treadmill could be outfitted with a joystick embedded on the grab bar where the walker would change direction on the path to tag a sign, an exercise cycle could be outfitted with moveable handle bar where the rider could steer on the path to tag a sign, and the like, by way of example only.

The optional network interface device 7 in the system is used to operatively couple and communicate between the system and other computing devices which can be coupled together via one or more communication networks, although other types and numbers of communication networks or systems with other types and numbers of connections and configurations can be used. By way of example only, the one or more communication networks can use TCP/IP over Ethernet and industry-standard protocols, including NFS, CIFS, SOAP, XML, LDAP, and SNMP, although other types and numbers of communication networks, such as a direct connection, a local area network, a wide area network, modems and phone lines, e-mail, and wireless communication technology, each having their own communication protocols, can be used.

Although examples of the system are described herein, the system can be implemented on any suitable computer system or computing device. It is to be understood that the devices and systems of the examples described herein are for exemplary purposes, as many variations of the specific hardware and software used to implement the examples are possible, as will be appreciated by those skilled in the relevant art(s).

Furthermore, each of the devices of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

The examples may also be embodied as a non-transitory computer readable medium having instructions stored thereon for one or more aspects of the present technology, which when executed by a processor causes the processor to carry out the steps necessary to implement the methods of the examples, as described and illustrated herein.

When using an iPACES™, task instructions are presented on-screen for the exerciser to read. Similarly, their score is presented on screen throughout use of the iPACES™ Reinforcers, such as praise words (e.g., "Good!"), are presented at key points to maintain interest and motivation. To ensure adequate physical activity, warnings are presented when the user's heart rate dips below the target heart rate range to maintain during exercise using the Heart Rate Reserve (HRR) method, Chodzko-Zajko W, Proctor D, Skinner J, et al. Med Sci Sports Exerc 2009; 41(7):1510-30, herein incorporated by reference in its entirety, for example, for longer than one minute (e.g., "Keep up your heart rate! Pedal faster or increase resistance").

In an illustrative embodiment, use of the iPACES™ preferably begins with a warm-up. The exerciser begins self-propulsion (of their avatar or from their avatar's viewpoint) and navigates along a virtual pathway in the video program. The warm-up is preferably performed for a predetermined length of time (e.g., five minutes to allow for physical acclimation—reach ideal HRR, cognitive acclimation—observe scenery, etc.). Example instructions: "Begin pedaling and steering along the bike path. Increase your effort until you comfortably reach your calculated ideal heart rate range."

Next, the exerciser will be inducted to a story board by reading a brief introduction, which provides a naturalistic context for the cognitive task. Example instructions: "Imagine you are going out today to take care of some errands. Some of the errands will be for you, but some may be for a friend who you are assisting. I will help you learn the order of the places where you will be going today."

A cognitive task means an assigned, measurable mental manipulation which can be experimentally verifiable. In accordance with an embodiment, the method includes the interactive combination of exercise and a cognitive task. The interaction of exercise and cognitive task can be accomplished by using the exercise equipment to perform the cognitive task. An embodiment of the cognitive task (e.g., working memory task), can include three steps: 1) registration of task, 2) verification of basic learning via discrimination, and 3) performance of a cognitive manipulation ("challenge task"). Although the task may have other numbers and types of steps. Using working memory as an example of a specific cognitive skill or executive function challenge, what follows is an illustration of, for example, the three steps involved in the Memory Lane™ game described below.

Figure 2:
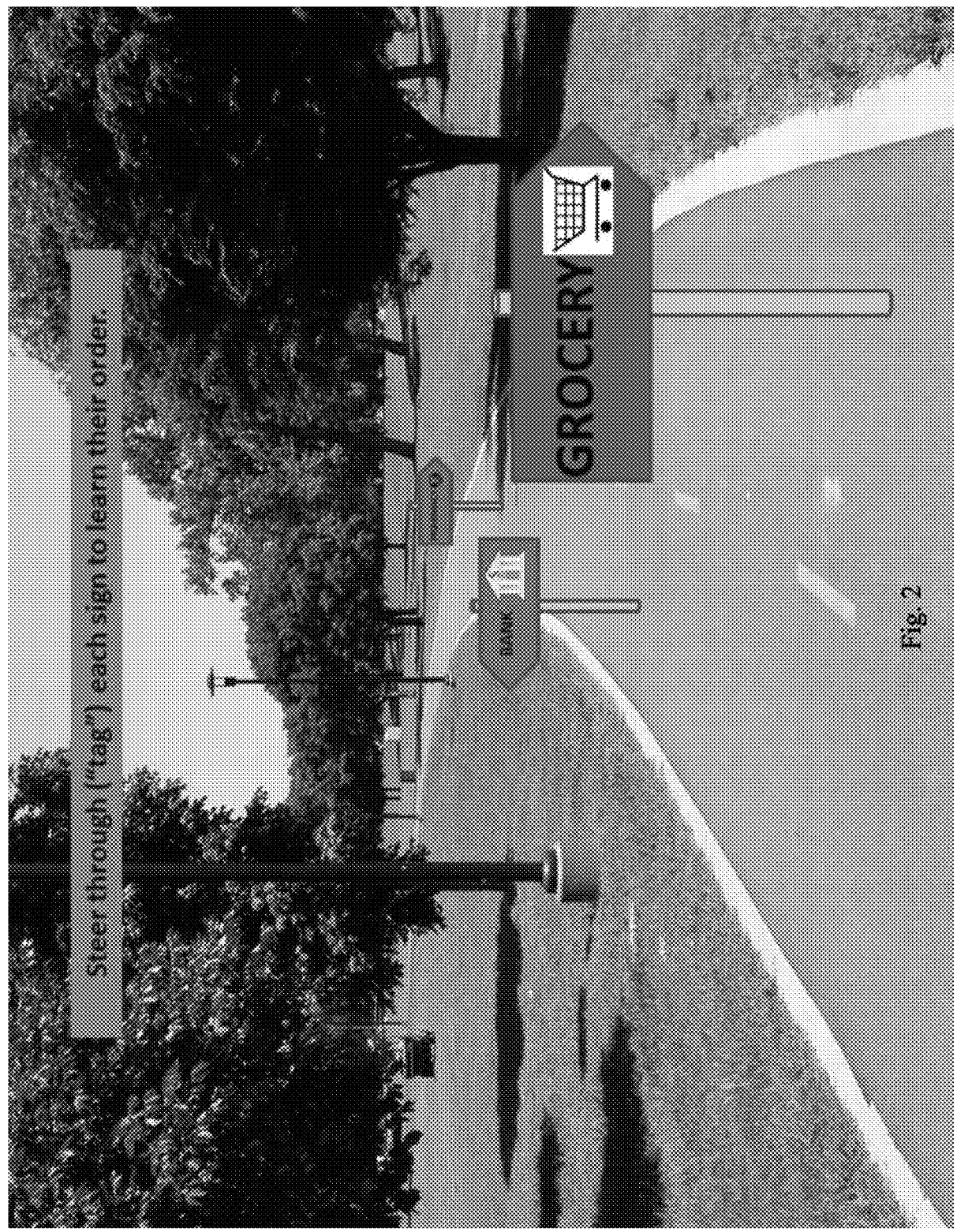
FIG. 2 is a screen shot relating to registration of an interactive cognitive task for a computer-based video program integrated with exercise equipment in accordance with the present disclosure.

Step 1 involves presentation of instructions to use forward propulsion and navigation to indicate registration of presented stimuli. Example instructions: "You will see a series of signs appear in the pathway in front of you. Steer through ("tag") each sign. Remember their order." A predetermined series of stimuli are presented (e.g., three signs indicating errand destinations, such as: bank, library, gas station, pharmacy, and grocery), as illustrated in FIG. 2. The stimuli are presented at a predetermined interval (e.g., every three seconds), and in a predetermined location (e.g., either left or right of the center of the path). The stimuli will be presented repeatedly until a predetermined number of successful trials of registration (tagging) are logged (preferably, two successful registration trials is sufficient). Although the trials may have other numbers and types of registrations.

Figure 3:
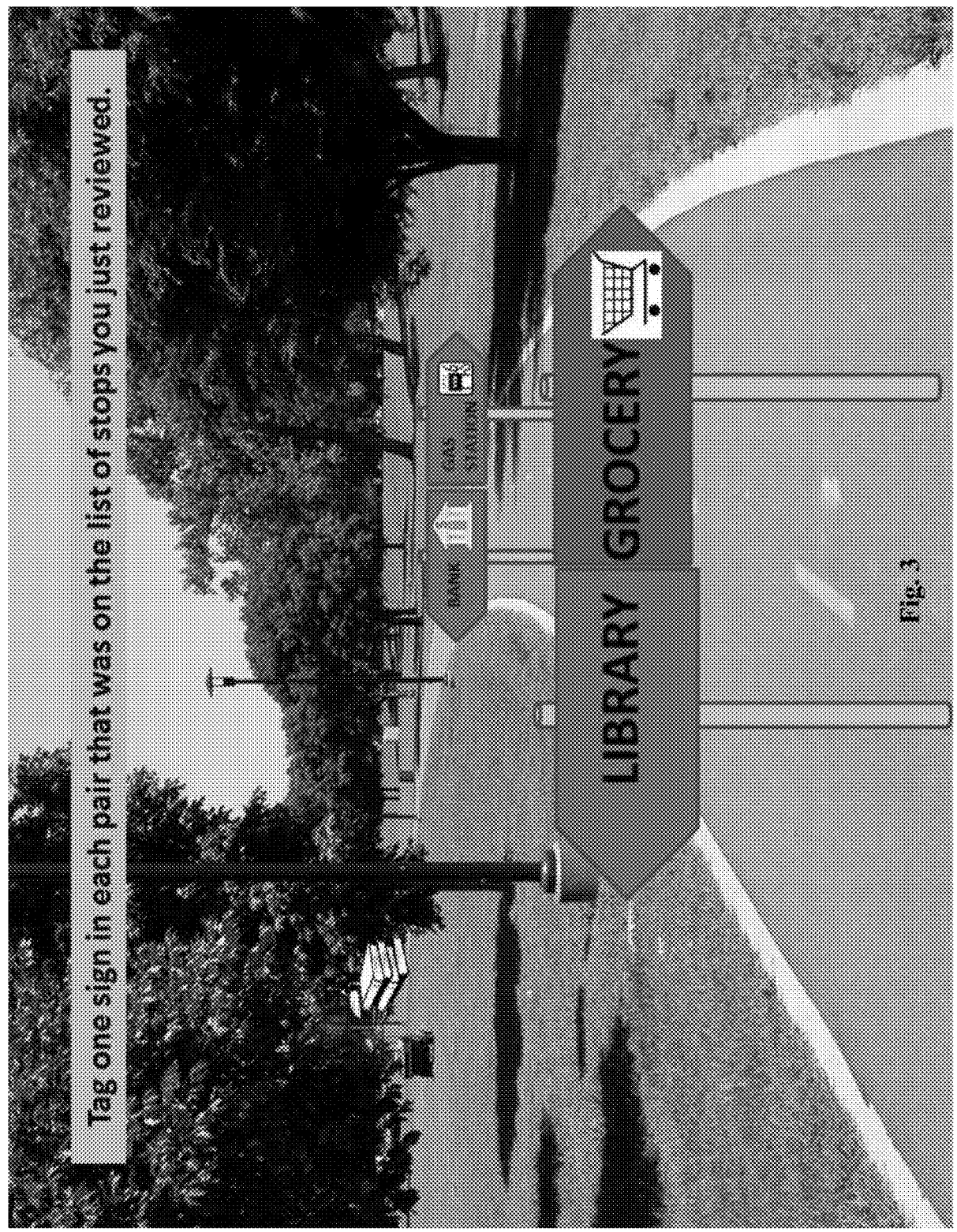
FIG. 3 is a screen shot relating to verification of discrimination of an interactive cognitive task for a computer-based video program integrated with exercise equipment in accordance with the present disclosure.

Step 2 involves verification of the basic learning of the task, in this example memorization of the errand list. Instructions are presented. Example instructions: "Now, two signs will appear at the same time, tag the one that was in the errand list you just reviewed." In this example the pairs of signs (e.g., bank-gas station; library-grocery, etc.), are presented at a predetermined interval (e.g., every three seconds), and in a predetermined order (e.g., just left and right of center), as illustrated in FIG. 3. The pairs are repeated until the correct responses are obtained (e.g., signs are tagged) a predetermined number of times (e.g., two times in a row) for successful verification. Although the trials may have other numbers and types of verification.

Figure 4:
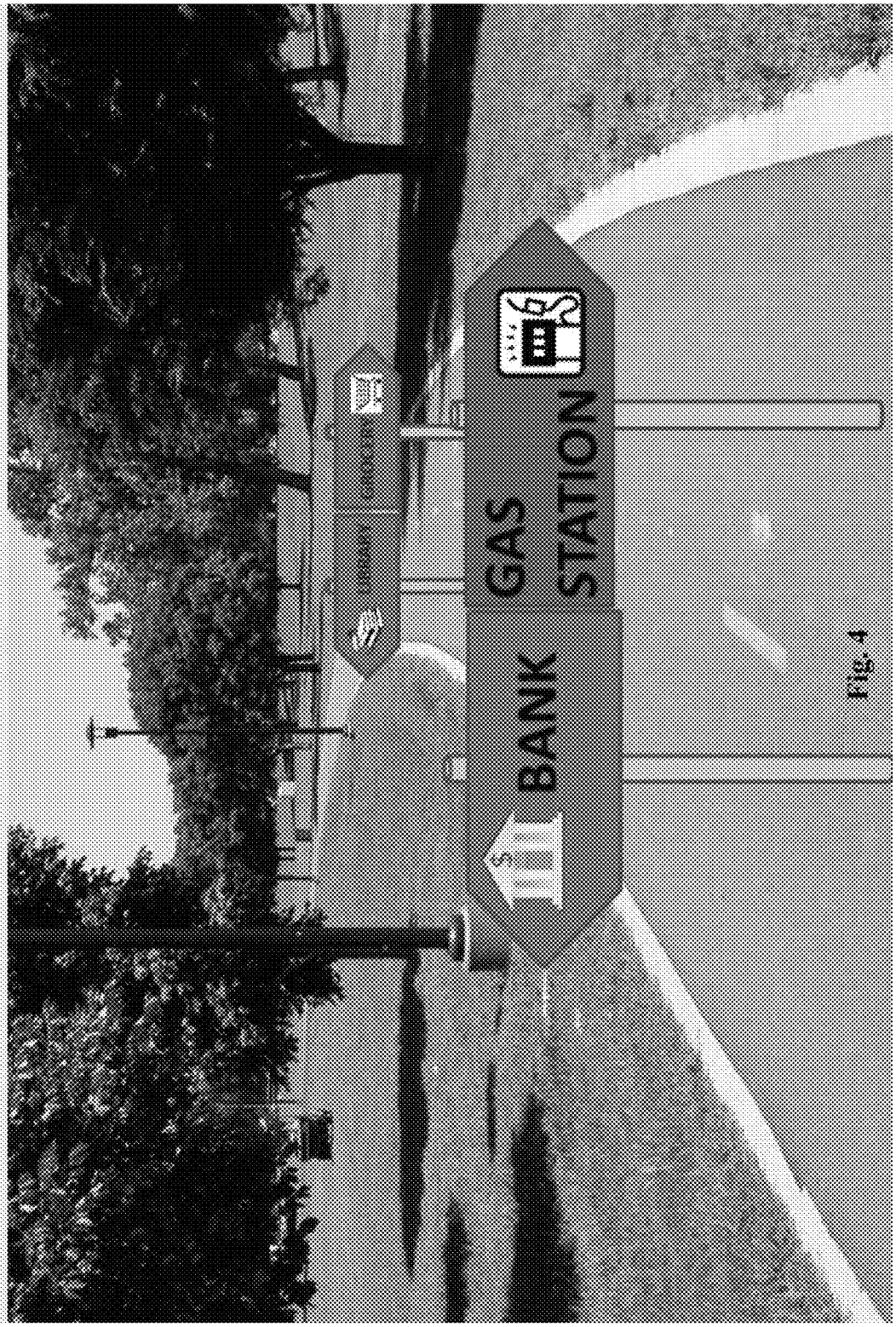
FIG. 4 is a screen shot relating to manipulation of an interactive cognitive task for a computer-based video program integrated with exercise equipment in accordance with the present disclosure

Step 3 involves performance of the cognitive manipulation ("challenge task"). In the selected working memory example, the task is to manipulate the learned list in a specified way for some characteristic (e.g., order or visual component) of the stimuli/list (e.g., repeat the list in reverse order; indicate list items in "n-back" order such as every 3rd item; correctly discriminate the color or location of the sign on which the errand was presented, etc.). Example of an updated story induction: "Good, imagine you have completed your errands, but just realized that you left something at the first stop. You must retrace your errand stops to retrieve your item from the first stop." Example task instructions: "Again, two signs will appear at the same time. But, this time you are to tag the signs on your errand list going BACKWARDS through your stops, in reverse order." Pairs of stimuli are presented (as noted in above predetermined interval and location) and the user discriminates between the two choices and select the correct stimuli by navigating through the object (e.g., bank-gas station; library-grocery, etc., are repeated until the correct three signs are tagged), as illustrated in FIG. 4, and this performance of the manipulation of the cognitive challenge is verified with a predetermined number of successful performances (e.g., two times). Although the trials may have other numbers and types of manipulation performances.

After the task is completed, in an embodiment the computer displays the user's updated score and preferably stores this information and level achieved preferably by the user's ID number. Although other types of displays and storage of results are possible. The user may continue to use the iPACES™ to increase the level of cognitive challenge. Future sessions preferably start at the same level of difficulty where the user left off during their last exercise session. For example, if the user fails to successfully complete the task after a predetermined number of attempts (e.g., three trials), the computer preferably adjusts the level of the challenge downward (e.g., the number of items on the list will be reduced by one). Similarly, if a task is mastered (e.g., performance with a given list length is successful), the challenge preferably will be increased until the exerciser has completed the maximum available challenge (e.g., list length of 15 items), in all available story-board versions (e.g., errand locations, tourist locations, etc.). At that point, the task challenge may be enhanced further by adding discrimination of other characteristics/features of the stimuli (e.g., instead of reverse order, the user will be instructed to watch for/recall "n-back" order, or the color of stimuli/sign, or the location of sign—left/right). Furthermore, challenge and training of specific cognitive functions may be added (e.g., impulsivity/inhibition aspects of executive function may be tasked when a distractor component of the story board is layered with another task, such as when a dog runs across the bike path just before a decision point is approached).

For example, in an embodiment if all such variations can be completed successfully during a period of about 2 weeks, then the maximal benefit possible for that individual will have been considered obtained. Preferably, the process is adjusted to the user's health and cognitive status. Cognitive outcomes and physical effort required to achieve benefit may vary accordingly. Preferred ranges include from about 20 to about 45 minutes per day for from about 3 to about 5 times per week, as an example, however other ranges and times may be used. The design is preferably adjustable to a level to match the cognitive skill of the user such that normative adults can use the process and find challenge, as well as those with some cognitive impairment, for example, MCI, early dementia, or TBI patients, which can utilize the process with a responsive feedback loop allowing a slower learning curve, and the like. The degree of benefit obtained (e.g., 10% improvement in working memory) should be verifiable with a comprehensive medical/neuropsychological evaluation before and after a predetermined period of training (e.g., 3-6 months).

An additional use of the iPACES™ may be to measure and estimate broader/generalized cognitive function(s) beyond "training to the task" (e.g., general working memory performance, or broader executive function skills, or ecological valid/naturalistic measures such as way-finding). Determination of this possible assessment utility/functionality should be possible with collection of data, in for example, a validation study.

An embodiment with the same basic 1/present-2/learn-3/manipulate protocol, includes alternate story boards (e.g., grocery shopping list, top 10 travel spots in each state, then country, etc.). Additionally, the above story boards could be enhanced by adding "layers" of challenge/helps that make it adaptive for normative to impaired older adults such as: a) distractors, e.g., birds, shoppers, etc., cross screen (executive function/inhibition challenge); and b) encoding cues, e.g., clip arts, auditory cues—item read or key sound (vs. list item only presented on-screen).

Neuro-exergaming is the integration of interactive physical exercise with cognitive challenge. Further embodiments include alternate "neuro-exergames" designed and tailored to address specific cognitive disabilities resulting from brain pathologies or dysfunctions. For example, a neuro-exergame may be designed for use with the iPACES™ to improve visuospatial function which may become impaired through a progressive dementia, such as Alzheimer's disease, or through a traumatic head injury (TBI). Similarly, a neuro-exergame may be designed to improve perception of social cues, which may be impaired due to a disorder on the autism spectrum. These expansions and applications of the iPACES™ approach may expand upon the 1-2-3 method/protocol (perhaps more like: 1=task presented and 2=performance, in addition to the initially developed and tested: 1/present-2/learn-3/manipulate protocol). Thus, a specific task may involve differentiating between designated emotions (e.g., steering toward a happy or sad face sign) while one pedals along a bike path.

Additional embodiments include neuro-exergames that match cognitive disability/brain dysfunction, the current prototype is geared toward executive function/working memory (which is salient for maintaining independence when a patient is experiencing some cognitive decline/MCI/mNCD with a goal of avoiding a full decline and dementia diagnosis such as due to Alzheimer's, etc.). Further versions may aim to address other cognitive functions, such as visuospatial impairments (loss of full function can be a key deficit in dementia of the Alzheimer's type and lead to loss of independence due to getting lost, needing to give up driving/keys to the car/etc.). Similarly, a focus may be on neuro-exergaming to address impaired perception of social cues, which is a known impaired ability in Autism spectrum disorder (ASD) caused by yet unspecified neuropathology that may be amenable to intervention via a neuro-exergame. Virtual and live social facilitation while exergaming. These expansions and applications of the iPACES™ approach may expand upon the 1-2-3 method/protocol (perhaps more like: 1=task presented and 2=performance, in addition to the initially developed and tested: 1/present-2/learn-3/manipulate protocol).

Example 1

The present example illustrates (1) the advantages of neuro-exergaming using the interactive physical and cognitive exercise system (iPACES™), wherein older adults engage in aerobic exercise (pedaling and steering a stationary bike along a virtual bike path to achieve their target heart rate), the action of which simultaneously and interactively controls play of a computerized game designed to train cognition (executive function, with a focus on working memory); and (2) the neuropsychological effects of the iPACES™ compared to that of: a) exergaming (i.e., pedaling and steering a stationary bike along a virtual bike path without a prescribed cognitive task, thus with relatively passive stimulation only), and b) neurogaming (i.e., playing a cognitive training game in a sedentary way, seated with a game controller).

Method

Participants: Participants (n=30) were healthy older adults (average age=68.8, range: 50-94). Nine participants were male and 21 were female, average years of education was 17, and most participants self-identified as Caucasian (87%), with four (one each) identifying as: African-American, Asian-American, Hispanic, and other (non-specified). Participants were randomly assigned to one of the three conditions described below (n=9, 10, 11 in each group). Participant characteristics were similar across the three groups, including age, retiree status, past experience with physical activity and computers, physical fitness estimate, etc.; only years of education were significantly different and was incorporated as a covariate in analyses (details in Table 1). After intent-to-treat analyses with the full sample of 30 participants (using multiple imputation of averages), sensitivity analyses were conducted after dropping the four participants with incomplete data and one participant with inadequate dose of the intervention (resulting in n=8, 9, 8 in each group).

Materials & Procedure: Participants were recruited by fliers and emails to the college campus and nearby community over the course of six months. Informed consent was obtained as well as demographic information (age, education, ethnicity, marital status, familiarity with biking and video games, and exercise history). The following cognitive measures were administered pre- and post-single bout (alternate forms were used at post-testing).

Verbal Memory Measure: *Alzheimer's Disease Assessment Scale (ADAS) Word Recall* (Mohs et al., 1997). Participants read aloud ten words presented on a card for 1-2 seconds, and immediate recall was subsequently solicited. The task was repeated twice more using the same list of words, but in a different order. Delayed recall was solicited after five minutes of an alternate cognitive task (herein Color Trails). This measure was included as a manipulation check of the active intervention which included memory components, but was not expected to alter core memory functions, rather the focus was to be on executive function consistent with prior literature and which would be salient to maintain for older adults aiming to remain independent.

Executive Function Measures: *Color Trails* (D'Elia et al., 1996), forms A and B, were preceded by a brief sample to orient the participant to the task. Form A required that participants connect numbered circles in order. Form B required connecting numbers in order, but also alternating the color of the circles, by choosing from among pink and yellow circles with the same number. A ratio was computed (time to complete Color Trails 2 divided by time to complete Color Trails 1; CT 2/1; Strauss, Sherman, & Spreen, 2006), with a lower time quotient representing better executive function.

*The Stroop Test* (40-item format; Van der Elst et al., 2006) required participants to verbally respond to three similar sets of stimuli. First, participants stated the name of each colored block (i.e., red, blue, and green). Second, participants read these three color names as typed in black ink. Finally, participants were presented with the same three typed color names, but printed in a contrasting ink (e.g., "red" typed in blue ink); participants stated the color of the ink. Time to complete was recorded, and a ratio (Stroop A/C) was computed (Lansbergen and colleagues; 2007), with higher ratio scores indicating better executive function.

*Digit Span* (Strauss, Sherman & Spreen, 2006). Participants first listened to a string of numbers and repeated the string in forward order (Digit Span Forward). String length was increased if at least one of two strings of a given length was recalled correctly. Participants then listened to a string of numbers and repeated them in reverse order, with the same discontinuation rule (Digit Span Backward). A ratio was computed (correct trials backward divided by the correct trials forward; Digits B/F), with higher ratios indicating better function.

Heart Rate (HR): Resting HR was measured before the intervention and used to compute target HR (i.e., Karvonen & Vuorimaa, 1988).

Experimental Conditions: All participants were seated upon a virtual reality enhanced, recumbent stationary bike. In the two gaming conditions (neuro-exergaming and neurogaming), a tablet was hung in front of the bike's built-in screen to display a theoretically-derived cognitive training game designed to further enhance executive function beyond that typical of physical exercise alone. In the two aerobic conditions (neuro-exergaming and exergaming), the participant was instructed to maintain their target HR as computed at the start of the session. Participants were randomly assigned to one of the following 20-minute single bout conditions:

Neuro-Exergaining:

The iPACES™ was set up such that a tablet was hung on the bike's existing screen and the game was interactively operated by the pedaling of the stationary bike (a hardwired cadence monitor and joystick connected the player's movements on the bike with the game). In this instance, as noted above the theoretically and empirically-derived focus was on training executive function via a working memory task wherein the participant was instructed to learn a list of neighborhood errand locations (e.g., doctor, pharmacy, grocer), pedal along a scenic pathway (reaching their target HR range), choose the correct location at each fork in the road, and then retrace the same path, choosing correctly at each decision point. The task is adaptive in that it gradually increases the length the errand list, but only after a player successfully completes two lists of the same length. This iPACES™ neuro-exergame provided simple feedback, such as "correct" or "incorrect" with redirection to try again. For example, the user was initially presented with four errand locations (e.g., grocery, doctor, pharmacy, library; for approximately 3 seconds each) and then presented a fork in the road (approximately 3 seconds after the list), where grocery was presented with a distractor (e.g., park). If at each fork, the user selected the correct errand location, they are asked to "return" home, choosing again the correct errand location at each fork in the road. Then they are presented with a $2^{nd}$ four-item errand list and if once completed successfully forward and backwards, the participant moves on to a five-item list. If errors are made, the participant has a chance to repeat the path and make new choices at each fork in the road, until two four-item lists are completed. Then the participant is presented a longer list (incrementally increasing by one item until the desired maximum list length, in this instance 10 errands, was completed successfully). Participants in the two physically active conditions were directed to maintain their target HR and could monitor their HR, minutes lapsed, and rotations per minute on the bike's screen. The iPACES™ neuro-exergame differs from traditional exergames by targeting a particular cognitive function, in this case executive function, and integrating controlled, measurable, and adaptive mental exercise, with the goal of maximizing benefit.

Exergaming:

Participants completed their single bout using a traditional "off-the-shelf" exergame, designed with some mental stimulation for exercise enhancement and entertainment purposes, but offering no specific cognitive challenge. Exergaming is technology-driven physical activity, such as video game play, that requires participants to be physically active or exercise in order to play the game. In this case, participants rode a "cybercycle" (as described above). The cybercycle simulates riding a bike along a scenic trail.

Neurogaming:

Participants completed the game developed for the iPACES™ (described above), but in a sedentary mode (without pedaling), wherein forward motion was controlled only by the joystick. This condition served as a control condition, to isolate the relative contribution of the cognitive training.

Final Measures and Procedures: After their 20-minute single bout experimental intervention, participants completed behavioral measures to allow FIR to decrease before cognitive re-evaluation. Verbal memory and executive function measures, as described above, were repeated (alternate forms) and participants were debriefed.

Statistical Analyses: Data were analyzed using SPSS version 19 for Windows (IBM Corporation). Repeated measure ANOVAs were used to examine group (neuro-exergame vs. exergame vs. neurogame) by time (baseline vs. post single-bout) interaction effects. Age, sex, and education were included as covariates in statistical analyses given their potential impact on neuropsychological test performance reported in the theoretical and empirical literature (Hannay, & Lezak, 2004; Lam et al., 2013). Follow-up analyses were conducted using paired t-tests (2-tailed) to examine change over time within each group.

Results

Intent-to-Treat Analyses:

For these analyses, all thirty enrolled participants were retrained regardless of missing data or incomplete participation. Imputation of averages was used for four participants with missing data (per above). A significant interaction effect for condition (neuro-exergaming, exergaming, neurogaming) by time (pre- and post-single bout), controlling for age, sex, and education, was found for one of the three tests of executive function (Color Trails: [F(2,24)=3.54; p=0.045; es=0.23]; see supplemental Table Si for details).

Sensitivity Analyses:

For these analyses, participants were retained who were "completers" (i.e., per above had completed both pre and post-testing and received an adequate dose of their assigned intervention; sample sizes for each group respectively: 8, 9, 8). A significant interaction effect for condition (neuro-exergaming, exergaming, neurogaming) by time (pre- and post-single bout), controlling for age, sex, and education, was found for one of the three tests of executive function (Color Trails: [F(2,19)=3.68; p=0.045; es=0.28]; see Table 2). Follow-up analyses (paired t-tests; 2-tailed) indicated that there was a significant improvement in executive function from pre- to post-single bout for neuro-exergaming (p=0.037), no significant change for exergaming (p=0.484) and a significant decrease for neurogaming (p=0.044). As expected, there was no significant interaction for verbal memory.

Discussion

This study demonstrated feasibility for older adults to use an aerobic neuro-exergame that was implemented using an interactive physical and cognitive exercise system (iPACES™). Furthermore, preliminary evidence from 30 older adults randomly assigned to a single bout of neuro-exergaming, exergaming, or neurogaming, demonstrated significant improvement in cognition from neuro-exergaming (exercise with specified interactive cognitive training) over and above either exergaming (exercise with no specified interactive cognitive training) or neurogaming (sedentary cognitive training alone). Neurogaming alone unexpectedly yielded a significant decline in cognitive function, which may have been due in part to some regression to the mean, but perhaps also due to a lack of activation from a relatively mundane cognitive training task of trying to learn and retain a list of errand locations. The present experiment with older adults attempts to tease apart the neuropsychological effects of interactive physical exercise (aerobic) and cognitive training, from its component parts (exercise alone or cognitive training alone).

A notable strength of the present disclosure is that the cognitive intervention has aimed for ecological validity (i.e., the task mimics real-life scenario key for maintaining independence of completing a list of errands and returning home) and as such, perhaps also greater propensity for generalizability of cognitive benefit beyond the training realm (i.e., future examples could assess whether long-term use increases length of time one remains independent vs. requiring institutionalization). As previously mentioned, there is considerable debate about whether training in one area of cognition will transfer to other areas, benefit global cognition, or translate into improvements in tasks of daily living. Prior studies have been limited by their cognitive interventions, because often they involve training on tasks that are unrelated to daily living. The present example overcomes this methodological limitation, as participants were asked to remember a list of errand locations, proceed accordingly, and then retrace their path back home, mirroring what many older adults actually do in their daily lives. Although the present example was limited to a single-bout analysis, ideally, future example will examine the long-term effects of training with the neuro-exergame.

Another strength of the present disclosure lies in the benefit of the iPACES™ technology used in implementation of this neuro-exergame, since a portable tablet-based game can be paired with existing exercise equipment (e.g., home-use stationary bike or elliptical, or even an under-desk pedaler), and thus have wider application than many older or unwieldy exergaming systems. This example provides preliminary evidence that an easily transportable, cost-effective tablet with a sophisticated neuro-exergame, can be used as a feasible interactive physical and cognitive exercise intervention for older adults. Long-term intervention that may aid in the treatment of cognitive declines (i.e., for those with MCI) may be limited by the costliness and inconvenience of the equipment required. A made-for-tablet cognitive training neuro-exergame that could easily be adapted to various exercise equipment is promising in terms of the eventual widespread distribution of a physical and cognitive exercise training program for the treatment of cognitive decline.

Figure 5:
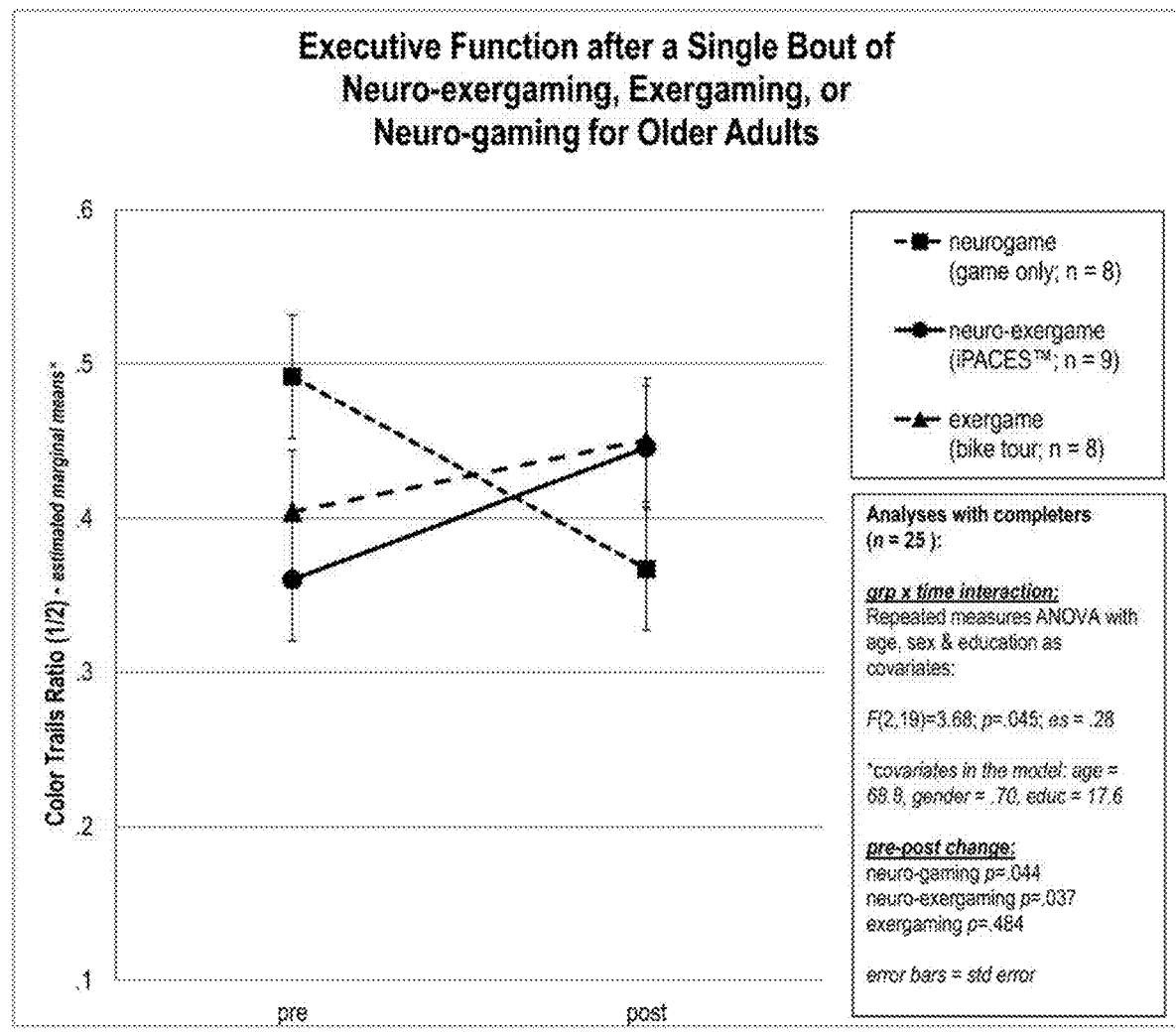
FIG. 5 is a graph showing executive function after a single bout of: neuro-exergaming, exergaming, or neurogaming for older adults.

In this example, the feasibility of iPACES™ for older adults was demonstrated and promising new evidence presented for a neuro-exergame to have greater cognitive benefit than either of its component parts administered separately, see FIG. 5.

TABLE 1

Demographics for all enrolled older adults (n = 30).

| | neurogame (n = 9) | | neuro-exergame (iPACES ™) (n = 10) | | exergame (n = 11) | | Total Enrolled (n = 30) | |
|---|---|---|---|---|---|---|---|---|
| | X | SD | X | SD | X | SD | X | SD |
| Demographics[a] | | | | | | | | |
| age | 67.0 | 15.3 | 66.3 | 10.8 | 72.6 | 12.3 | 68.8 | 12.7 |
| education (yrs)[b] | 16.0 | 3.3 | 19.2 | 3.2 | 17.6 | 2.6 | 17.6 | 3.2 |
| sex (% female) | 89% | | 60% | | 64% | | 70% | |
| Ethnicity (% Caucasian) | 89% | | 90% | | 90% | | 87% | |
| Retiree Status (% retired)c | 56% | | 50% | | 64% | | 57% | |
| Marital Status (% married) | 33% | | 70% | | 27% | | 43% | |
| Self Rated Physical Activity (SRPA)[d] | 3.0 | 1.5 | 3.6 | 1.4 | 3.1 | 1.5 | 3.2 | 1.3 |
| Past experience[a] | | | | | | | | |
| cycling | 2.0 | .71 | 2.4 | .71 | 2.6 | .60 | 2.4 | .85 |
| computers | 3.2 | .71 | 3.6 | .87 | 3.0 | .97 | 3.3 | .91 |
| videogames | 1.0 | .60 | 1.0 | .71 | 0.5 | .60 | 0.8 | .71 |

TABLE 1-continued

Demographics for all enrolled older adults (n = 30).

|  | neurogame (n = 9) | | neuro-exergame (iPACES ™) (n = 10) | | exergame (n = 11) | | Total Enrolled (n = 30) | |
| --- | --- | --- | --- | --- | --- | --- | --- | --- |
|  | X | SD | X | SD | X | SD | X | SD |
| Motivations to exercise[f] | | | | | | | | |
| increase fitness | 4.9 | .33 | 4.9 | .32 | 4.9 | .30 | 4.9 | .31 |
| think more clearly | 4.8 | .44 | 4.8 | .42 | 4.2 | 1.08 | 4.6 | .77 |
| improve mood | 4.7 | .71 | 4.8 | .42 | 4.3 | 1.10 | 4.6 | .82 |
| increase alertness | 4.7 | .71 | 4.5 | .85 | 4.3 | .90 | 4.5 | .82 |
| because of social support | 4.3 | 1.66 | 4.6 | .70 | 4.3 | 1.27 | 4.4 | 1.22 |

[a]medical status not assessed formally, legs unable to rotate legally blind, yet able familial resting tremor but unsolicited, one participant in each pedaler group noted medical info:
[b]of those not retired, current nurse, secretary, business owner, administrator, college occupations included: engineer researcher, professor employee, manager
[c]significant difference between groups, used as covariate
[d]scale: 1-5 (inactive to vigorous 3+ days/week) Jurca et al. 2005
[e]scale: 0-4 (none to lots)
[f]scale: 0-5 (disagree to agree)

TABLE 2

Results with "completers" and covariates: age, education and sex (n = 25)
Table 2. Results with "completers" and covariates: age, sex, and education (n = 25).

|  |  | pre | | post | | grp × time | | |
| --- | --- | --- | --- | --- | --- | --- | --- | --- |
| Measure | Group (n = 8, 9, 8) | X[a] | SD | X[ab] | SD | [F(2,19)] | p | es |
| Executive Function: | | | | | | | | |
| Stroop A/C | neurogame | .44 | .08 | .47 | .08 | .65 | .53 | .06 |
|  | neuro-exergame (iPACES ™) | .49 | .08 | .47 | .09 | | | |
|  | exergame | .44 | .08 | .45 | .08 | | | |
| Color Trails 1/2 | neurogame | .49 | .15 | .37 | .14 | 3.68 | .04 | .28 |
|  | neuro-exergame (iPACES ™) | .36 | .15 | .45 | .14 | | | |
|  | exergame | .40 | .14 | .45 | .13 | | | |
| Digits B/F | neurogame | .56 | .17 | .73 | .20 | 1.89 | .18 | .17 |
|  | neuro-exergame (iPACES ™) | .65 | .17 | .69 | .20 | | | |
|  | exergame | .66 | .16 | .62 | .19 | | | |
| Verbal Memory: | | | | | | | | |
| ADAS delayed recall | neurogame | 7.34 | 1.38 | 7.06 | 1.81 | .49 | .62 | .05 |
|  | neuro-exergame (iPACES ™) | 7.02 | 1.39 | 7.64 | 1.82 | | | |
|  | exergame | 6.64 | 1.33 | 7.10 | 1.74 | | | |

[a]marginal means with covariates evaluated at the following values: age = 67.1, sex = .72, educ = 17.6
[b]bolded mean indicates pre to post change within group was significant (p < .05)

TABLE S1

Intent to-treat analyses with imputation of averages and covariates: age, education and sex (n = 30)
Table S1. Results with "intent-to-treat" sample, imputation, and covariates: age, sex, and education (n = 30)

|  |  | pre | | post | | grp × time | | |
| --- | --- | --- | --- | --- | --- | --- | --- | --- |
| Measure | Group (n = 9, 10, 11) | X[a] | SD | X[a] | SD | [F(2,24)] | p | es |
| Executive Function: | | | | | | | | |
| Stroop A/C | neurogame | .44 | .09 | .48 | .09 | .94 | .40 | .07 |
|  | neuro-exergame (iPACES ™) | .49 | .08 | .48 | .09 | | | |
|  | exergame | .46 | .08 | .45 | .08 | | | |
| Color Trails 1/2 | neurogame | .49 | .14 | .36 | .13 | 3.54 | .04 | .23 |
|  | neuro-exergame (iPACES ™) | .36 | .14 | .44 | .13 | | | |
|  | exergame | .42 | .13 | .44 | .12 | | | |

TABLE S1-continued

Intent to-treat analyses with imputation of averages and covariates: age, education and sex (n = 30)
Table S1. Results with "intent-to-treat" sample, imputation, and covariates: age, sex, and education (n = 30)

| | | pre | | post | | grp × time | | |
|---|---|---|---|---|---|---|---|---|
| Measure | Group (n = 9, 10, 11) | $X^a$ | SD | $X^a$ | SD | [F(2,24)] | p | es |
| Digits B/F | neurogame | .56 | .17 | .73 | .18 | 3.21 | .06 | .21 |
| | neuro-exergame (iPACES ™) | .67 | .16 | .69 | .18 | | | |
| | exergame | .69 | .16 | .61 | .17 | | | |
| Verbal Memory: | | | | | | | | |
| ADAS delayed recall | neurogame | 6.75 | 1.80 | 7.22 | 1.68 | .04 | .96 | .003 |
| | neuro-exergame (iPACES ™) | 6.85 | 1.77 | 7.62 | 1.66 | | | |
| | exergame | 6.61 | 1.71 | 7.19 | 1.60 | | | |

$^a$marginal means with covariates evaluated at the following values: age = 68.8, sex = .70, educ = 17.6

Example 2

In-home, long-term pilot of the iPACES™ yielded the following results with in-home use of the Memory Lane™ prototype game on the iPACES™.

Figure 6:
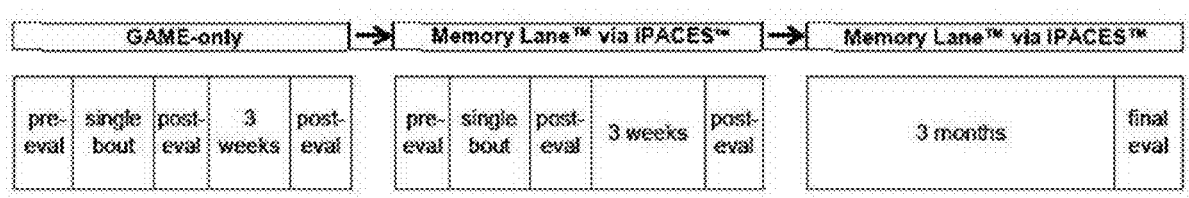
FIG. 6 is a timeline showing A-B design.

Single bout comparison: An in-home trial examined the feasibility and cognitive benefit for older adults of in-home use of the neuro-exergame, Memory Lane™, implemented via the iPACES™ (tablet interconnect with an under-table elliptical). An A-B design, FIG. 6, was used in which all participants completed a single bout of Memory Lane™ as a game-only and later as a neuro-exergame using the iPACES™ (elliptical control of the game). Results from six older adults who completed both single bouts indicates an advantage of neuro-exergaming over game-only with greater and statistically significant increase in executive function (Stroop A/C ratio; p=0.02; es=0.51).

Figure 7:
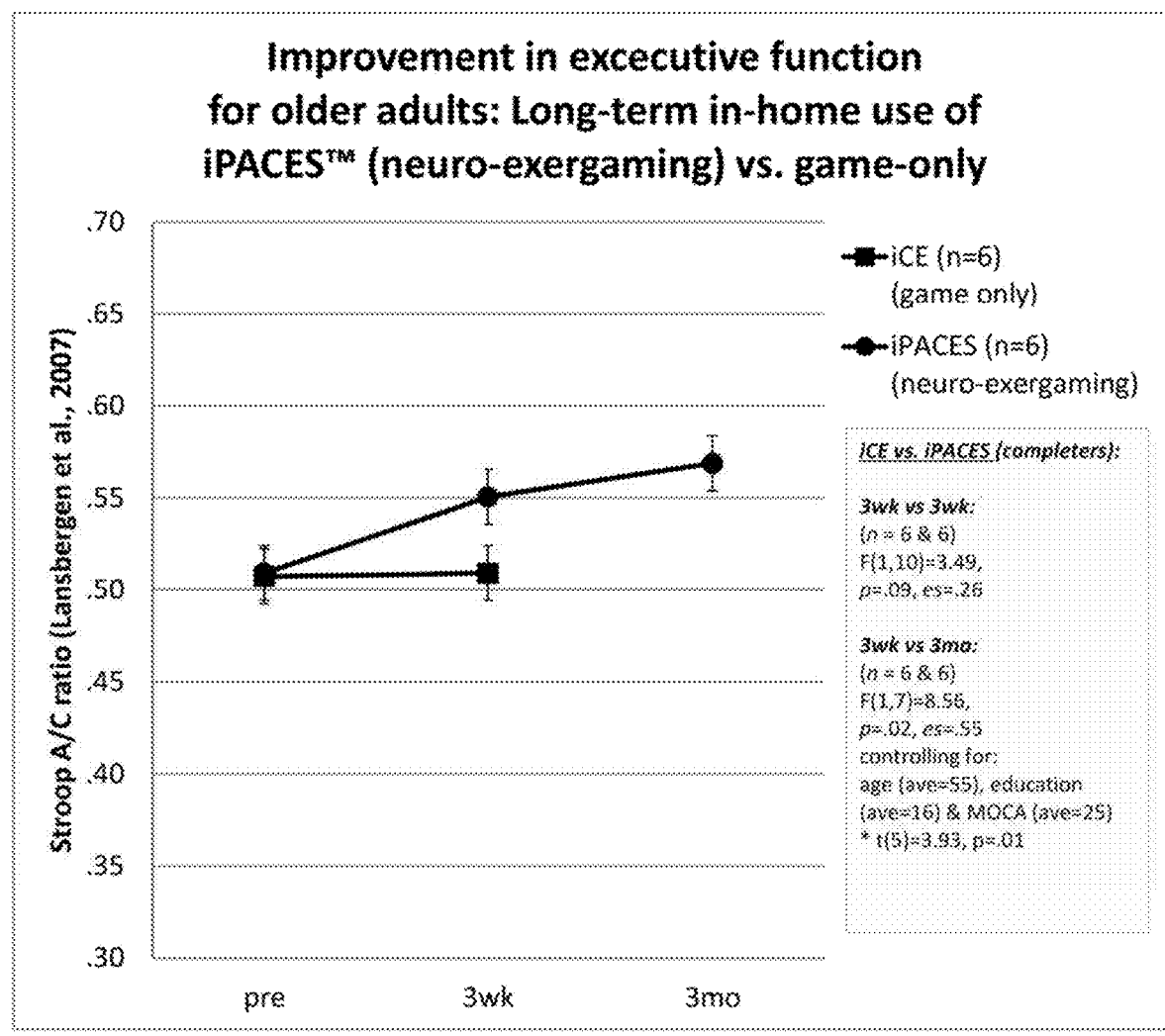
FIG. 7 is a graph showing improvement in executive function for older adults: long-term in-home use of neuro-exergaming vs. game-only.

Longer-term use comparison: In the same single-bout trial above, the A-B design was extended to longer-term use, in which all participants over a 3-week period in-home, first used the game-only (3×/wk) for the first weeks, followed by neuro-exergaming (elliptical control) at a similar rate for a 3-month period. The data shown in FIG. 7 indicates that the neuro-exergame yielded significantly greater improvement in cognition than the initial game-only condition.

Having thus described the basic concept of the disclosure, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the disclosure. Additionally, the recited order of processing elements or sequences, or the use of numbers, letters, or other designations therefore, is not intended to limit the claimed processes to any order except as may be specified in the claims.

What is claimed is:
1. A method for enhancing cognitive function of an individual by the neuro-exergaming performance of an interactive physical and cognitive task, comprising:
   self-propelling with stationary exercise equipment an individual's avatar or avatar's point of view through a virtual pathway for a predetermined length of time;
   registering a cognitive task designed to improve a specific neuropsychological function by continuously self-propelling the avatar or avatar's point of view along the virtual pathway, wherein the virtual pathway comprises a first plurality of different locations, each location of the first plurality of different locations occupied by task stimuli, and steering, by operation of the stationary exercise equipment, the avatar or avatar's point of view through selecting at least one of the first plurality of different locations by integrating an individual's physical exercise movements on the stationary exercise equipment with a mental decision to tag the desired task stimuli, thereby registering the task stimuli;
   verifying a learning of the cognitive task via discrimination by continuously self-propelling the avatar or avatar's point of view through a second plurality of different locations along the virtual pathway occupied by the registered task stimuli and steering, by operation of the stationary exercise equipment, the avatar or avatar's point of view through selecting at least one of the second plurality of different locations by integrating the individual's physical exercise movements on the stationary exercise equipment with a mental decision to tag the registered task stimuli, thereby verifying the task stimuli; and
   performing a cognitive manipulation of the cognitive task by continuously self-propelling the avatar or avatar's point of view through a third plurality of different locations along the virtual pathway occupied by the verified task stimuli and steering, by operation of the stationary exercise equipment, the avatar or avatar's point of view through selecting at least one of the third plurality of different locations by integrating the individual's physical exercise movements on the stationary exercise equipment with a mental decision to tag the verified task stimuli.
2. The method of claim 1, further comprising:
   providing to the individual instructions comprising a first cognitive task comprising presented stimuli;
   executing a first set of presented stimuli of the first cognitive task by self-propelling on the stationary exercise equipment and navigating the individual's avatar or avatar's point of view through the virtual pathway whereby the propulsion and navigation are controlled by the individual to register the first set of presented stimuli at a first time in accordance with the instructions;
   repeating the execution of the first set of presented stimuli until registering the first set of presented stimuli of the first cognitive task a predetermined number of times in accordance with the instructions;
   executing a second set of presented stimuli of the first cognitive task by self-propelling on the stationary exer- cise equipment and navigating the individual's avatar or avatar's point of view through the virtual pathway whereby the propulsion and navigation are controlled by the individual to verify discrimination of the second set of presented stimuli at a first time in accordance with the instructions;

repeating the execution of the second set of presented stimuli until verifying discrimination of the second set of presented stimuli of the first cognitive task a predetermined number of times in accordance with the instructions;

executing a third set of presented stimuli of the first cognitive task by self-propelling on the stationary exercise equipment and navigating the individual's avatar or avatar's point of view through the virtual pathway whereby the propulsion and navigation are controlled by the individual to perform manipulation of the third set of presented stimuli at a first time in accordance with the instructions; and repeating the execution of the third set of presented stimuli until performing the manipulation of the third set of presented stimuli of the first cognitive task a predetermined number of times in accordance with the instructions.

3. The method of claim 2, wherein the stationary exercise equipment is adapted to simulate cycling, rowing, skiing, climbing, paddling, walking, jogging, or running.

4. The method of claim 2, wherein self-propelling the individual's avatar or avatar's point of view comprises increasing effort until the individual reaches a target heart rate range and maintaining the individual's heart rate within the target heart rate range continuously during the neuro-exergaming performance of the interactive physical and cognitive task.

5. The method of claim 2, wherein the stationary exercise equipment comprises a video screen and the instructions comprise a story providing a naturalistic context on the video screen.

6. The method of claim 2, wherein the first set of presented stimuli comprises a series of individual stimuli presented at a predetermined interval and in a predetermined location.

7. The method of claim 6, wherein the predetermined interval is three seconds and the predetermined location is at least one of left and right of the center of the virtual pathway.

8. The method of claim 2, wherein registering the first set of presented stimuli of the first cognitive task a predetermined number of times comprises two consecutive executed trials.

9. The method of claim 2, wherein the second set of presented stimuli comprises a series of paired individual stimuli presented at a predetermined interval, in a predetermined order, and in a predetermined location.

10. The method of claim 9, wherein the predetermined interval is three seconds and the predetermined location is at least one of left and right of the center of the virtual pathway.

11. The method of claim 2, wherein the second set of presented stimuli is in an order different than an order of the first set of presented stimuli.

12. The method of claim 2, wherein verifying the second set of presented stimuli of the first cognitive task a predetermined number of times comprises two consecutive successfully executed trials.

13. The method of claim 2, wherein the third set of presented stimuli comprises a series of paired individual stimuli which is a manipulation of the second set of presented stimuli.

14. The method of claim 13, wherein the third set of presented stimuli comprises a plurality of paired individual stimuli presented at a predetermined interval and in a predetermined location.

15. The method of claim 13, wherein performing the third set of presented stimuli of the first cognitive task a predetermined number of times comprises two consecutive successfully executed trials.

16. The method of claim 2, wherein each of the first set, the second set, and the third set comprises from three to fifteen stimuli.

17. The method of claim 2, further comprising performing the method at least five times per week for a minimum of about 45 minutes each time during a two week period.

18. The method of claim 2, wherein the cognitive task comprises a working memory task, executive function skills, verbal memory, visual memory, visuo-spatial skill, attention, psycho-motor skills, or reaction time.

19. A system for enhancing cognitive function of an individual comprising:

a computing device comprising a memory coupled to one or more processors which are configured to execute programmed instructions stored in the memory;

stationary exercise equipment; and an input and display device interface coupled to the computing device and the stationary exercise equipment, wherein the stationary exercise equipment is coupled to the computing device to interactively enable the individual to use the stationary exercise equipment to continuously self-propel an individual's avatar or avatar's point of view through a virtual pathway for a predetermined length of time by neuro-exergaming performance of an interactive physical and cognitive task designed to improve a specific neuropsychological function, and wherein the processors are configured to execute programmed instructions stored in the memory processor comprising providing to the individual instructions comprising a first cognitive task comprising presented stimuli; executing a first set of presented stimuli of the first cognitive task by continuously self-propelling on the stationary exercise equipment and navigating the individual's avatar or avatar's point of view through the virtual pathway whereby the propulsion and navigation are controlled by the individual to register the first set of presented stimuli at a first time in accordance with the instructions by steering the avatar or avatar's point of view through a first plurality of locations along the virtual pathway occupied by the presented stimuli by integrating the individual's physical exercise movements on the stationary exercise equipment with a mental decision to tag the presented stimuli; repeating the execution of the first set of presented stimuli until registering the first set of presented stimuli of the first cognitive task a predetermined number of times in accordance with the instructions; executing a second set of presented stimuli of the first cognitive task by continuously self-propelling on the stationary exercise equipment and navigating the individual's avatar or avatar's point of view through the virtual pathway whereby the propulsion and navigation are controlled by the individual to verify discrimination of the second set of presented stimuli at a first time in accordance with the instructions by steering the avatar or avatar's point of view through a second plurality of locations along the virtual pathway occupied by the registered stimuli by integrating the individual's physical exercise movements on the stationary exercise equipment with a mental decision to tag the registered stimuli; repeating the execution of the second set of presented stimuli until verifying discrimination of the second set of presented stimuli of the first cognitive task a predetermined number of times in accordance with the instructions; executing a third set of presented stimuli of the first cognitive task by continuously self-propelling on the stationary exercise equipment and navigating the individual's avatar or avatar's point of view through the virtual pathway whereby the propulsion and navigation are controlled by the individual to perform manipulation of the cognitive task of the third set of presented stimuli at a first time in accordance with the instructions by steering the avatar or avatar's point of view through a third plurality of locations along the virtual pathway occupied by the verified stimuli by integrating the individual's physical exercise movements on the stationary exercise equipment with a mental decision to tag the verified stimuli; and repeating the execution of the third set of presented stimuli until performing manipulation of the third set of presented stimuli of the first cognitive task a predetermined number of times in accordance with the instructions.

20. A non-transitory computer readable medium having stored thereon instructions for enhancing cognitive function of an individual comprising machine executable code which when executed by at least one processor, causes the processor to perform steps comprising:

providing to the individual instructions comprising a first cognitive task designed to improve a specific neuropsychological function comprising presented stimuli;

executing a first set of presented stimuli of the first cognitive task by continuously self-propelling on stationary exercise equipment and navigating an individual's avatar or avatar's point of view through the virtual pathway whereby propulsion and navigation are controlled by the individual to register the first set of presented stimuli at a first time in accordance with the instructions by steering the avatar or avatar's point of view through a first plurality of locations along the virtual pathway occupied by the presented stimuli by integrating the individual's physical exercise movements on the stationary exercise equipment with a mental decision to tag the presented stimuli;

repeating the execution of the first set of presented stimuli until registering the first set of presented stimuli of the first cognitive task a predetermined number of times in accordance with the instructions;

executing a second set of presented stimuli of the first cognitive task by continuously self-propelling on the stationary exercise equipment and navigating the individual's avatar or avatar's point of view through the virtual pathway whereby the propulsion and navigation are controlled by the individual to verify discrimination of the second set of presented stimuli at a first time in accordance with the instructions by steering the avatar or avatar's point of view through a second plurality of locations along the virtual pathway occupied by the registered stimuli by integrating the individual's physical exercise movements on the stationary exercise equipment with a mental decision to tag the registered stimuli;

repeating the execution of the second set of presented stimuli until verifying discrimination of the second set of presented stimuli of the first cognitive task a predetermined number of times in accordance with the instructions;

executing a third set of presented stimuli of the first cognitive task by continuously self-propelling on the stationary exercise equipment and navigating the individual's avatar or avatar's point of view through the virtual pathway whereby the propulsion and navigation are controlled by the individual to perform manipulation of the cognitive task of the third set of presented stimuli at a first time in accordance with the instructions by steering the avatar or avatar's point of view through a third plurality of locations along the virtual pathway occupied by the verified stimuli by integrating the individual's physical exercise movements on the stationary exercise equipment with a mental decision to tag the verified stimuli; and repeating the execution of the third set of presented stimuli until performing manipulation of the third set of presented stimuli of the first cognitive task a predetermined number of times in accordance with the instructions.

* * * * *